Figure 1:
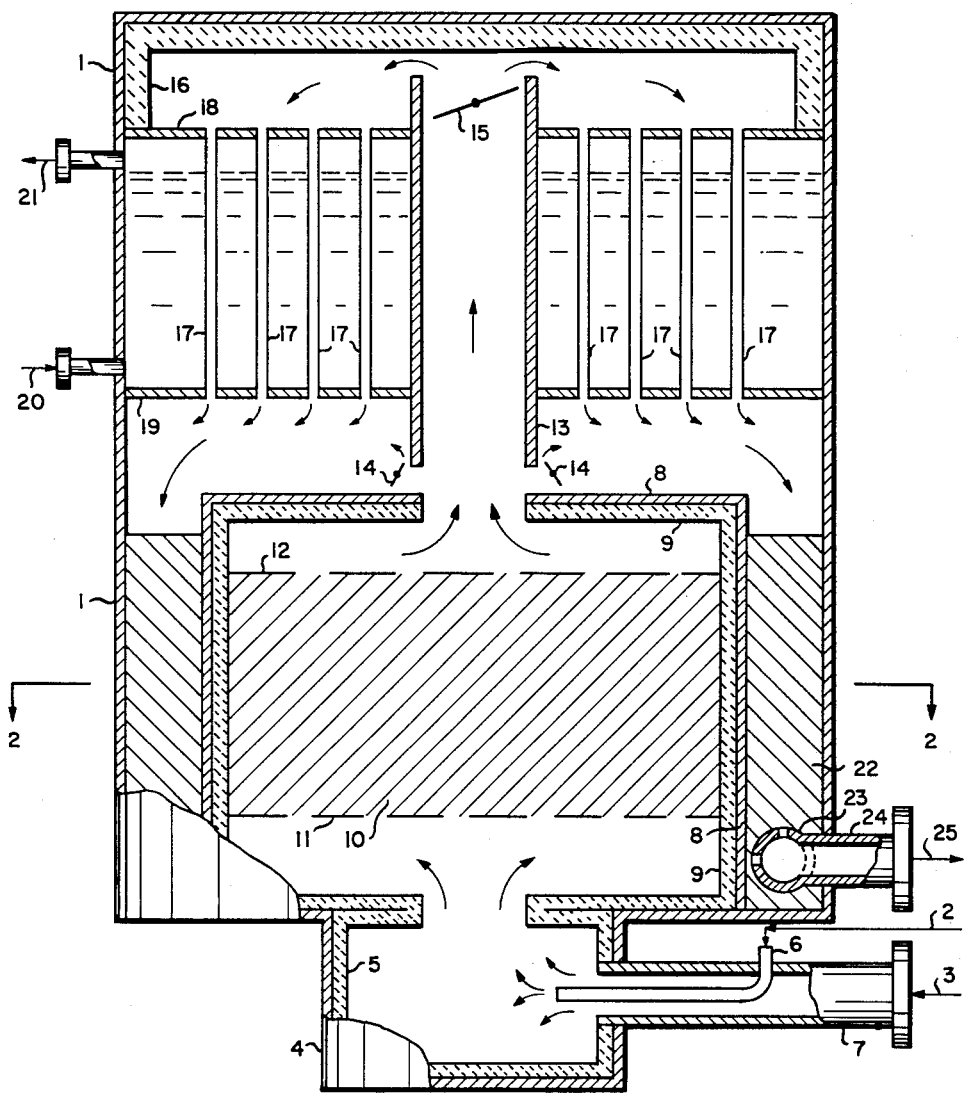

July 26, 1966

G. R. JAMES ET AL 3,262,758

APPARATUS FOR REFORMING SYNTHESIS GAS

Filed March 19, 1963

2 Sheets-Sheet 1

GEORGE RUSSELL JAMES
PAUL KORWIN
*INVENTORS.*

BY *J. T. Chalvity*

AGENT

July 26, 1966　　　G. R. JAMES ET AL　　　3,262,758
APPARATUS FOR REFORMING SYNTHESIS GAS Filed March 19, 1963

GEORGE RUSSELL JAMES
PAUL KORWIN
*INVENTORS.*

BY J. T. Claloty

AGENT

United States Patent Office 3,262,758
Patented July 26, 1966

3,262,758
APPARATUS FOR REFORMING
SYNTHESIS GAS
George Russell James, Armonk, and Paul Korwin, Flushing, N.Y., assignors to Chemical Construction Corporation, New York, N.Y., a corporation of Delaware
Filed Mar. 19, 1963, Ser. No. 266,348
8 Claims. (Cl. 23—288)

This invention relates to apparatus for the conversion of fluid hydrocarbons to synthesis gas or hydrogen. A unitary apparatus arrangement is provided, in which the multiple process steps of secondary reform and CO-oxidation are carried out in adjacent sections of the furnace, with the CO-oxidation section acting as thermal insulation for secondary reform.

The process steps involved in the reaction of fluid hydrocarbons such as methane with steam to produce hydrogen or ammonia synthesis gas are well known. The initial process stream is a mixture of fluid hydrocarbon and steam. This mixture is passed through the initial or primary reforming stage, which is carried out in a tubular reformer. The tubes are packed with nickel catalyst and externally fired. A primary reform process gas stream is thus produced which contains hydrogen, carbon monoxide, steam and unreacted hydrocarbon.

The primary reformer gas stream is now treated to convert the balance of unreacted hydrocarbon, in a step known as secondary reforming. A stream of oxygen-containing gas, such as air, is reacted with the primary reformed gas stream. When ammonia synthesis gas is produced, a stochiometric proportion of air is employed in the secondary reform step to yield a final gas stream containing hydrogen and nitrogen in a 3:1 ratio. The combustion reaction which takes place due to oxygen addition causes a rise in gas stream temperature and some further conversion of hydrocarbon. Residual hydrocarbon is reacted by passing the gas stream through a bed of secondary reform catalyst, which is of a nature similar to primary reform catalyst.

The resulting crude synthesis gas is a mixture of hydrogen, carbon monoxide, carbon dioxide and steam. The gas stream is now cooled in heat exchange means such as a steam boiler prior to a final stage of reaction known as CO-oxidation. In this final stage, the cooled gas stream is passed through one or more beds of promoted iron oxide catalyst, in order to react carbon monoxide with steam thus yielding further hydrogen.

In the present invention, a unitary apparatus arrangement is provided, in which the process steps of secondary reform and CO-oxidation are carried out in co-acting arrangement within the same process vessel. The invention is characterized by the provision of a bed of secondary reform catalyst within an inner container, with a bed of CO-oxidation catalyst being provided in the annular space between the inner container and an outer container. Thus, the bed of CO-oxidation catalyst acts as a temperature moderator and serves as insulation to protect the outer container from the high temperature maintained in the secondary converter section. The outer container acts as a high pressure retention vessel. This arrangement thus permits the outer container to be constructed of carbon steel, instead of the alloy steel previously employed in the prior art. As a further result of this new arrangement, a more compact equipment design is provided with considerably reduced piping, heat losses and cost. Stresses in stainless piping and "hot spots" in the apparatus are eliminated. Finally, due to the unitary apparatus arrangement, the utilization of heat is considerably improved, which results in higher process efficiency.

It is an object of the present invention to produce synthesis gas by means of improved apparatus.

Another object is to produce synthesis gas in a unitary apparatus, in which the process steps of secondary reform and CO-oxidation take place in co-acting arrangement within the same process vessel.

A further object is to provide an improved apparatus for the secondary reforming and subsequent processing of synthesis gas.

An additional object is to provide an apparatus for production of synthesis gas which is unitary, compact, and provides better heat utilization.

An object is to provide an apparatus for combined secondary reform and CO-oxidation, in which the bed of CO-oxidation catalyst acts as a heat barrier and thermal insulation for the bed of secondary reform catalyst.

Figure 2:
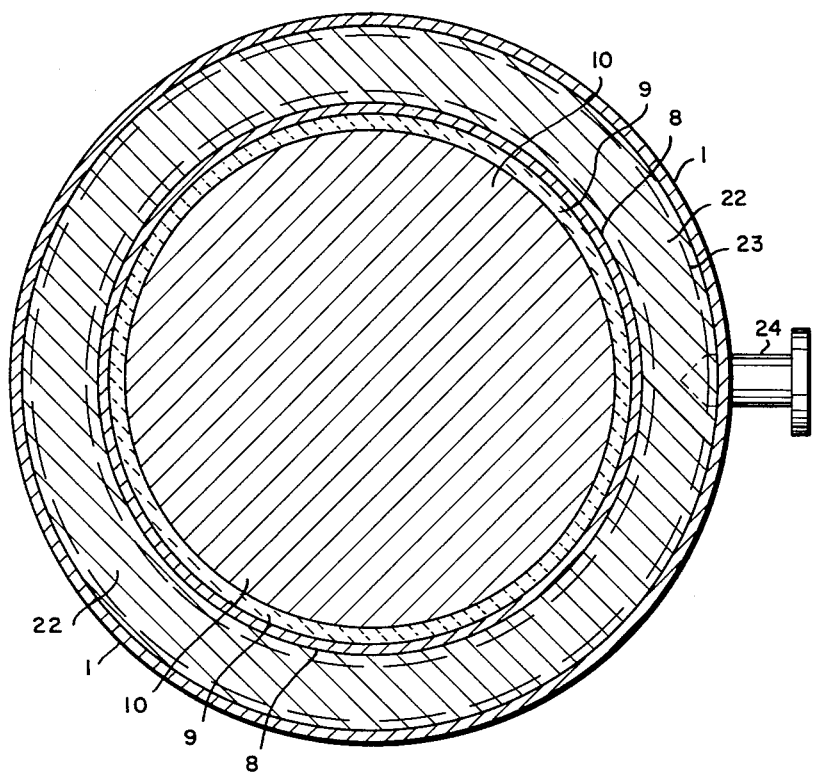

These and other objects and advantages of the present invention will become evident from the description which follows. Referring to the figures:

FIGURE 1 is an overall elevation view of the apparatus combination in a preferred embodiment, and FIGURE 2 is a plan view of FIGURE 1, taken on section 2—2.

In FIGURE 1, container 1 is a high pressure reactor-converter vessel in which the several process stages are mounted and combined. Vessel 1 will preferably be cylindrical in horizontal cross-section. Primary reformed gas stream 2 and an oxygen-containing gas stream 3, are directed into bottom combustion chamber 4, which is provided with refractory lining 5. Streams 2 and 3 are preferably passed into the furnace section by means of concentric conduits 6 and 7 respectively, although other gas entry means may be provided. Stream 2 will typically be at a temperature of about 1300° F. and pressure of from about 15 p.s.i.g. to 600 p.s.i.g. or more. Internal duct 6 will thus usually consist of stainless steel pipe, which becomes heated and freely expands into the combustion chamber. A cone or baffle, not shown, may be provided at the outlet of duct 6, to disperse the reformed gas stream 2 and provide more uniform reaction in the combustion chamber. In addition, a baffle or mound of broken refractory or checker brick may be provided in the combustion chamber, to break the kinetic energy of the gas stream thus protecting the opposite refractory wall from hot gas impact.

Outer conduit 7 will generally consist of a carbon steel pipe. The oxygen-containing gas stream 3, typically consisting of process air, flows in the annular space between conduits 6 and 7 and is preheated by hot pipe 6. The air stream thus acts as insulation between the hot internal pipe 6 and outer conduit 7, thus permitting the use of carbon steel as a material of construction for conduit 7. It will be evident that this gas entry arrangement eliminates the problem of costly stainless steel loops or expansion joints, since the internal pipe 6 is freely suspended and thermal expansion merely causes expansion of the pipe into the furnace section.

The mixed process gases react in the combustion chamber. The resulting combustion will raise the process gas stream temperature from 1300° F. to about 2000° F. The hot gas stream now rises from chamber 4, passing into inner container 8 provided with refractory lining 9. Chamber 8 is typically a cylindrical vessel, coaxial with outer container 1, and constructed of stainless steel. A catalyst bed 10 consisting of nickel-promoted secondary reform catalyst is mounted in container 8, and is supported by grid 11 and retained by upper retention baffle 12. Bed 10 will typically be at a temperature of about 1650° F., and final catalytic conversion of unreacted hydrocarbon in the gas stream thus is accomplished in bed 10. An intermediate layer of broken refractory or oversized catalyst, not shown, may be provided immediately above support grid 11. This intermediate layer serves to cushion the impact of hot upflowing process gas, and thus serves to protect the catalyst against spalling due to thermal shock. The movement or fluidization which would result in attrition and grinding of catalyst particles is prevented by retention baffle 12 which also serves to prevent entrainment of catalyst particles in the gas stream. Alternatively, a stainless steel screen with a layer of broken refractory may be provided for this purpose.

The rising gas stream now passes upwards out of bed 10 and leaves chamber 8 via a central upper outlet. The gas stream next flows upwards to the upper section of container 1 via central conduit 13, for cooling in the heat exchange section. A portion of the gas stream may be bypassed around the heat exchange section, passing out of the lower end of conduit 13 via openings controlled by control dampers 14. The relative proportion of gas passing upwards through conduit 13 is also controlled by upper main damper 15 which is provided to directly control gas flow in conduit 13. In suitable cases, depending on gas stream temperature, damper 15 may be completely closed, in which case all of the gas stream will bypass conduit 13 and flow out of the openings adjacent to dampers 14.

The main gas stream flow now passes out of the top of conduit 13, and into the upper section of container 1 defined by refractory lining 16. Here the gas flow direction is reversed, and the gas stream is divided into portions which pass through the fire tubes 17 of the steam boiler section of the apparatus. Tubes 17 extend between upper horizontal partition 18 and lower partition 19. Boiler feed water is passed via 20 into the annular space between container 1 and central conduit 13, and external to fire tubes 17. Generated steam formed by heat exchange between the boiler feed water and the hot gas stream passing down through the fire tubes, is removed via 21. It will be understood that various steam boiler accessories, such as flashing drum, safety relief valve, blowdown connection, non-condensable gas removal means and steam entrainment separator will also be included in an operating installation.

The cooled gas stream is discharged from the lower ends of the fire tubes 17, and is typically at a temperature of about 700° F. Additional temperature control may be provided by injecting saturated or superheated steam through a circular sparger. The gas stream is diverted by the upper surface of container 8 into the annular space between containers 1 and 8. A bed 22 consisting of CO-oxidation catalyst is provided in this annular space, and the downflowing gas stream is further reacted in bed 22 at a typical average temperature of 700° F., with reaction between carbon monoxide and steam leading to further formation of free hydrogen in the gas stream. The final converted gas stream is collected from the bottom of bed 22 via circular header 23 which is provided with openings for gas inlet. Header 23 discharges to conduit 24 which in turn passes the final gas stream via 25 to further processing such as carbon dioxide removal by scrubbing with hot potassium carbonate or monoethanolamine solution. A finished hydrogen-rich or ammonia synthesis gas stream is thus produced.

FIGURE 2 is a plan view of the apparatus, taken on section 2—2. Thus, the interrelation between CO-oxidation catalyst bed 22 and the secondary reform bed 10 is clearly evident. The CO-oxidation bed 22 completely surrounds and encloses the hot reform bed 10, thus containing the high temperature conditions and permitting the use of carbon steel for pressure vessel wall 1.

Numerous alternatives and apparatus equivalents may be provided within the scope of the present invention. Thus, other types of steam boilers or analogous heat exchange apparatus may be provided in place of the fire-tube boiler which represents only the preferred embodiment of the present invention. In addition, cooling means may be provided within CO-oxidation bed 22 to moderate any temperature rise which may occur due to the exothermic reaction which takes place.

Various means for control of gas flow may be adopted, instead of the adjustable dampers 14 and 15. Thus, it will be evident that conduit 13 may be adjustably mounted so that vertical displacement may be obtained. In this case, conduit 13 could be moved downward so as to restrict the gas flow opening between the conduit 13 and the top of container 8. Similarly, a horizontal baffle could be provided above the top of conduit 13 so that upward adjustment of conduit 13 would serve to restrict the upward flow of hot process gas through conduit 13. Other alternative apparatus equivalents will occur to those skilled in the art. Thus, it will be evident that the several apparatus elements may be arranged so as to provide for horizontal rather than vertical flow of the process gas stream.

What we claim is:

1. Synthesis gas furnace for combined secondary reform and carbon monoxide oxidation which comprises a vertically extending outer container, a refractory-lined inner container within said outer container and spaced away from said outer container to provide a fluid passage chamber between said containers, said inner container being filled with a bed of hydrocarbon reform catalyst, a bed of catalyst for carbon monoxide oxidation disposed in said fluid passage chamber between said inner container and said outer container, a refractory-lined combustion chamber extending adjacent to an inlet for gas entry into said inner container, means to pass primary reformed gas and an oxygen-containing gas into said combustion chamber whereby combustion of a portion of said primary reformed gas takes place and the resulting mixed gas stream passes through said gas entry inlet and into said inner container, means to pass reformed gas mixture from said inner container to heat removal means, means to pass cooled reformed gas mixture from said heat removal means to said bed of carbon monoxide oxidation catalyst in said fluid passage chamber, and means to remove the final gas stream from said bed of carbon monoxide oxidation catalyst.

2. Synthesis gas furnace for combined secondary reform and carbon monoxide oxidation which comprises a vertically extending cylindrical outer container, a refractory-lined cylindrical inner container coaxially aligned within the lower part of said outer container and spaced away from said outer container, whereby an annular fluid passage space is provided between said containers, said inner container being filled with a bed of hydrocarbon reform catalyst, a bed of catalyst for carbon monoxide oxidation disposed in said annular space between said inner container and said outer container, a refractory-lined combustion chamber below said inner container, said combustion chamber extending adjacent to a lower inlet for gas entry into said inner container, means to pass primary reformed gas and an oxygen-containing gas into said combustion chamber whereby combustion of a portion of said primary reformed gas takes place and the resulting mixed gas stream passes through said gas entry inlet and into said inner container, an upper gas outlet from said inner container extending to heat recovery means disposed in the upper part of said outer container, means to pass cooled reformed gas mixture from said heat recovery means to the top of said bed of carbon monoxide oxidation catalyst, and means to remove the final gas stream from said outer container at the bottom of said bed of carbon monoxide oxidation catalyst.

3. Apparatus of claim 2, in which said means to pass primary reformed gas and an oxygen-containing gas into said combustion chamber comprises two concentric circular conduits, with the primary reformed gas passing through the inner conduit and the oxygen-containing gas passing through the annular space between the inner and outer conduits.

4. Apparatus of claim 2, in which said heat recovery means comprises a steam boiler.

5. Synthesis gas furnace for combined secondary reform and carbon monoxide oxidation which comprises a vertically extending cylindrical outer container, a refractory-lined cylindrical inner container coaxially aligned within the lower part of said outer container and spaced away from said outer container, whereby an annular fluid passage space is provided between said containers, said inner container being filled with a bed of hydrocarbon reform catalyst, a bed of catalyst for carbon monoxide oxidation disposed in said annular space between said inner container and said outer container, a refractory-lined combustion chamber below said inner container, said combustion chamber extending adjacent to a lower inlet for gas entry into said inner container, means to pass primary reformed gas and an oxygen-containing gas into said combustion chamber whereby combustion of a portion of said primary reformed gas takes place and the resulting mixed gas stream passes through said gas entry inlet and into said inner container, a central upper gas outlet from said inner container, a central gas conduit extending upwards from said upper gas outlet and terminating within said container adjacent to the upper end of said container, whereby hot reformed gas is passed to the top section of said container, upper and lower substantially horizontal partitions extending in the annular space between said central gas conduit and the wall of said outer container, a plurality of opposed openings in said partitions, a plurality of fire tubes extending between said openings, whereby hot reformed gas passes downwards through said fire tubes, means to pass boiler feed water into the annular space between said central gas conduit and said outer container and external to said fire tubes, means to remove generated steam from the annular space below said upper partition and between said central gas conduit and said outer container, means to pass cooled reformed gas from said fire tubes to the top of said bed of carbon monoxide oxidation catalyst, and means to remove the final gas stream from said outer container at the bottom of said bed of carbon monoxide oxidation catalyst.

6. Apparatus of claim 5, in which said means to pass primary reformed gas and an oxygen-containing gas into said combustion chamber comprises two concentric circular conduits, with the primary reformed gas passing through the inner conduit and the oxygen-containing gas passing through the annular space between the inner and outer conduits.

7. Apparatus of claim 5, in which gas outlet means is provided in the lower portion of said central conduit below said lower partition, whereby at least a portion of the hot reformed gas passing from said inner container is by-passed around said fire tubes and passes directly to said carbon monoxide oxidation catalyst.

8. Apparatus of claim 7, in which adjustable damper means is provided within said central conduit, whereby gas flow through said central conduit is restricted and controlled.

References Cited by the Examiner

UNITED STATES PATENTS

| | | | |
|---|---|---|---|
| 1,386,760 | 8/1921 | Bosch | 23—289 X |
| 1,833,188 | 11/1931 | Larson | 23—289 X |
| 2,472,254 | 6/1949 | Johnson | 23—288 X |
| 2,887,365 | 5/1959 | Rycker et al. | 23—289 X |
| 3,190,730 | 6/1965 | Korwin et al. | 23—288 |

FOREIGN PATENTS

| | | |
|---|---|---|
| 917,989 | 9/1946 | France. |
| 977,786 | 11/1950 | France. |

MORRIS O. WOLK, *Primary Examiner.*

JOSEPH SCOVRONEK, *Examiner.*